Patented Jan. 5, 1954

2,665,210

UNITED STATES PATENT OFFICE 2,665,210

METHOD OF REFINING RAW COCOA AND RAW MASSES MADE THEREFROM

Oskar Friedrich Kaden, Hamburg-Gross Flottbeck, Germany

No Drawing. Application July 5, 1951, Serial No. 235,371

Claims priority, application Germany July 15, 1950

3 Claims. (Cl. 99—23)

The present invention relates to the refining of raw cocoa and of raw masses made therefrom. Heretofore, numerous methods of refining cocoa beans have been suggested. The majority of these methods concern some kind of aftertreatment of commercial cocoa beans which aftertreatment is supposed to be effected in chocolate factories by means of heat, air under pressure, steam, boiling, or by treatment with lime or other alkali salts. Furthermore, to the same end, fermentation processes have been employed on plantations for processing green cocoa beans.

The value of all these methods of improving the taste and aroma of cocoa beans is disputed. In most instances, these known methods do not change the taste but they harmfully affect the aroma. The same applies to all admixtures heretofore suggested which merely make it possible to obtain a better solubility of the roasted cocoa. However, for processing raw cocoa, especially for fermenting the same, or for aftertreating raw cocoa in chocolate factories, it is of great importance, as far as possible to build up the ingredients which are decisive for taste and aroma. This goal, however, cannot be obtained by the heretofore known methods, particularly not as far as the tanning means or the coloring matter identical to the tanning means of the green cocoa beans are concerned.

The steadily getting worse of the various commercial cocoa qualities is to be attributed to physiologic cocoa diseases which result from the generally customary extensive cocoa cultivation. Cocoa beans from diseased trees are more tanniferous than are normally ripened cocoa beans and do not respond any longer either to the old customary processing methods practiced in the countries or origin, or to the refining methods heretofore employed in the chocolate factories.

It is, therefore, an object of this invention, to provide a method of refining raw cocoa which will remedy the situation above referred to.

It is a further object of this invention to provide a method of refining cocoa, which will remedy the deficiencies of diseased or insufficiently fermented cocoa beans.

It is another object of this invention to provide a method of treating raw cocoa in such a way that the interior structure, color, taste, and aroma of the ingredients of the cocoa beans will be advantageously changed while avoiding undesired acids and foreign odors.

A still further object of this invention consists in the provision of a method of treating raw cocoa or chocolate masses, which will improve the taste and aroma thereof.

It is also an object to provide a method of the type set forth in the preceding paragraph, which will prevent the finished product from getting dull and spotty as it has been observed heretofore when poor cocoa has been used.

These and other objects and advantages of the invention will appear more clearly from the following specification in connection with the example contained therein.

General principle

The defects of diseased or insufficiently fermented cocoa beans are remedied according to the present invention by subjecting the said beans in a liquid medium and for a short period of time to pressure above atmosphere and subsequently to a pressure below atmosphere. As liquid medium I use, according to the present invention, a diluted mixture of alcohol and acetic acid. It has been found that with this treatment, the desired change in the ingredients of cocoa beans is being effected by hydrolysis and intercellular exchange in such a manner that the interior structure, color, taste, and aroma is so changed as if a natural afterfermentation had occurred. As a result thereof, there will also be no undesired and objectionable acid condition or foreign odors as they are encountered with various cocoa sources.

The method according to the present invention is also applicable with the same favorable effect to cocoa and chocolate raw masses and, when so applied, will prevent the finished product made from such raw masses from getting dull and spotty.

Example

In an autoclave, 1 part by weight of raw cocoa together with 2 parts by weight of water having admixed thereto from 0.1 to 0.2% by weight of a mixture of alcohol and acetic acid is subjected to a pressure of 2 kilograms per sq. centimeter for a period of from 5 to 10 minutes, and immediately thereafter is subjected to a vacuum of 10 to 20 millimeters water column (approximately 2.048 to 4.096 lb./sq. ft.). Thereupon, the cocoa beans are dried again.

Liquid chocolate and coating masses of roasted or unroasted cocoa beans may be treated in a corresponding manner.

It is, of course, understood that the present invention is, by no means, limited to the specific example set forth above but also comprises any modifications within the scope of the appended claims.

What I claim is:

1. A method of refining raw cocoa and raw masses made therefrom, which includes the steps of subjecting the material to be refined, in the presence of water containing a small quantity of a mixture of alcohol and acetic acid, to pressure above atmosphere for a short period of time, and immediately thereafter subjecting the thus treated material to pressure below atmosphere.

2. A method of refining raw cocoa and raw masses made therefrom, which includes the steps of subjecting the material to be refined, in the presence of water containing alcohol and acetic acid, to pressure of approximately 2 kilograms per sq. centimeter for a period of approximately 5 to 10 minutes, and immediately thereafter subjecting the thus treated material to pressure below atmosphere.

3. A method of refining raw cocoa and raw masses made therefrom, which includes the steps of subjecting 1 part by weight of the material to be refined together with 2 parts by weight of water having admixed thereto from 0.1 to 0.2% by weight of a mixture of alcohol and acetic acid to a pressure of approximately 2 kilograms per sq. centimeter for a period ranging approximately from 5 to 10 minutes, and immediately thereafter subjecting the thus treated material to a vacuum of approximately 2.048 to 4.096 lb./sq. ft.

OSKAR FRIEDRICH KADEN.

References Cited in the file of this patent

UNITED STATES PATENTS

| Number | Name | Date |
|---|---|---|
| 1,004,870 | Greisser | Oct. 3, 1911 |
| 2,278,483 | Plews | Apr. 7, 1942 |

OTHER REFERENCES

The Chemistry, Flavouring, and Manufacture of Chocolate Confectionary and Cocoa, by H. R. Jensen, published by J. and A. Churchill, London, England (1931), pages 10, 84.